(12) United States Patent
Blight et al.

(10) Patent No.: US 6,725,696 B1
(45) Date of Patent: Apr. 27, 2004

(54) DISC TUMBLER LOCK AND KEY

(75) Inventors: Brian Blight, Carnegie (AU); Hans Juergen Esser, Keysborough (AU)

(73) Assignee: Lockwood Australia Pty Ltd. (AU)

( * ) Notice: Subject to any disclaimer, the term of this patent is extended or adjusted under 35 U.S.C. 154(b) by 0 days.

(21) Appl. No.: 09/485,799

(22) PCT Filed: Aug. 10, 1998

(86) PCT No.: PCT/AU98/00627

§ 371 (c)(1), (2), (4) Date: Feb. 15, 2000

(87) PCT Pub. No.: WO99/09280

PCT Pub. Date: Feb. 25, 1999

(30) Foreign Application Priority Data

Aug. 15, 1997 (AU) .............................................. PO8575
Feb. 3, 1998 (AU) .............................................. PP1593

(51) Int. Cl.[7] .............................................. E05B 29/04
(52) U.S. Cl. .............................. 70/366; 70/369; 70/371; 70/386
(58) Field of Search .......................... 70/365, 366, 367, 70/368, 369, 371, 386, 337

(56) References Cited

U.S. PATENT DOCUMENTS

| 2,613,528 | A | * | 10/1952 | Salmivuori | 70/366 |
|---|---|---|---|---|---|
| 3,260,080 | A | * | 7/1966 | Wellekens | 70/371 |
| 4,109,495 | A | * | 8/1978 | Roberts | 70/365 |
| 4,418,555 | A | * | 12/1983 | Uyeda | 70/366 |
| 4,512,166 | A | | 4/1985 | Dunphy et al. | 70/366 |
| 4,624,119 | A | | 11/1986 | Newman et al. | 70/366 |
| 4,672,827 | A | | 6/1987 | Craig | 70/367 |
| 4,712,400 | A | | 12/1987 | Steinbach | 70/369 |
| 5,279,138 | A | * | 1/1994 | Gallagher | 70/369 X |
| 5,335,520 | A | * | 8/1994 | Lee | 70/365 X |
| 5,490,405 | A | * | 2/1996 | Rämö et al. | 70/366 |
| 5,613,389 | A | * | 3/1997 | Häuser | 70/366 |

FOREIGN PATENT DOCUMENTS

| EP | 0 534 740 | | 3/1993 | | |
|---|---|---|---|---|---|
| EP | 0 622 508 | | 11/1994 | | |
| GB | 1441026 | * | 6/1976 | | 70/366 |

* cited by examiner

Primary Examiner—Lloyd A. Gall
(74) Attorney, Agent, or Firm—Lerner, David, Littenberg, Krumholz & Mentlik, LLP

(57) ABSTRACT

A rotatable disc having a tubular lock assembly including a tubular sleeve and a number of disc tumblers located within the sleeve. A side locking bar is operative to prevent rotation of the assembly relative to a body, and that bar is rendered inoperative by insertion of a correct key into the lock keyway. The disc tumblers include a number of standard tumblers and a special tumbler. The locking bar is inoperative when each standard tumbler is at a service position of rotation and the special tumbler is at either a service position or a second function position of rotation. A service key is operable to place all tumblers at the service position, and a special change key is operable to place the special tumbler at the second function position to allow removal of the barrel assembly.

45 Claims, 8 Drawing Sheets

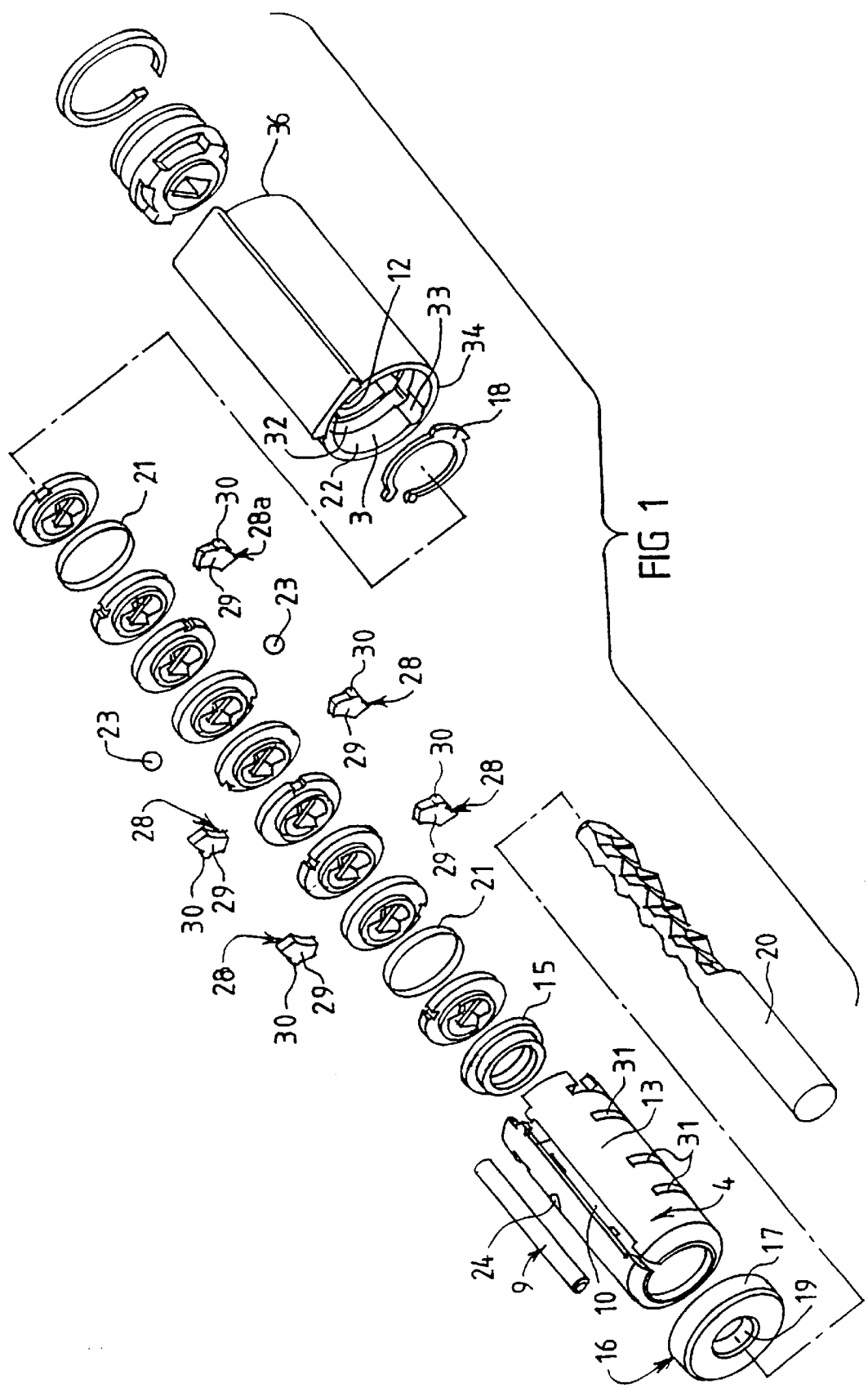

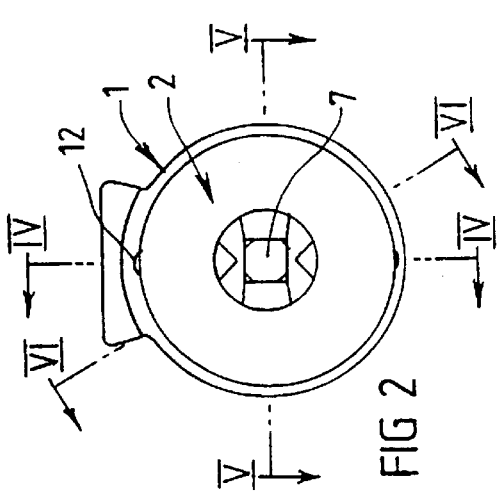
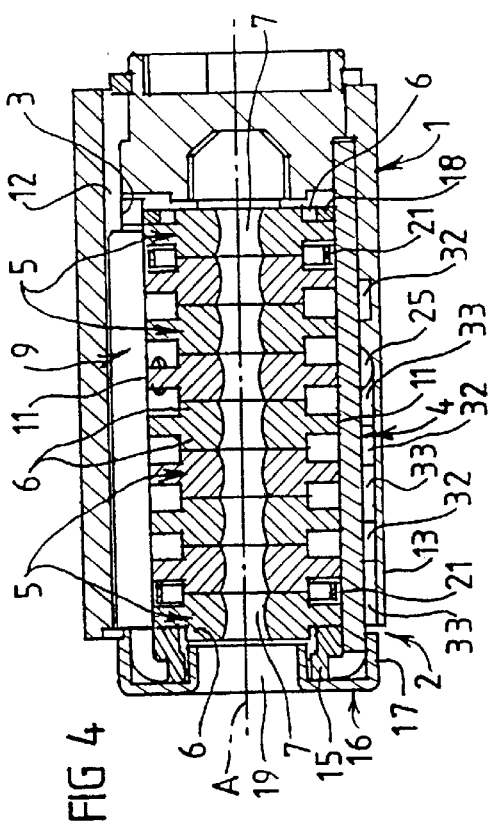
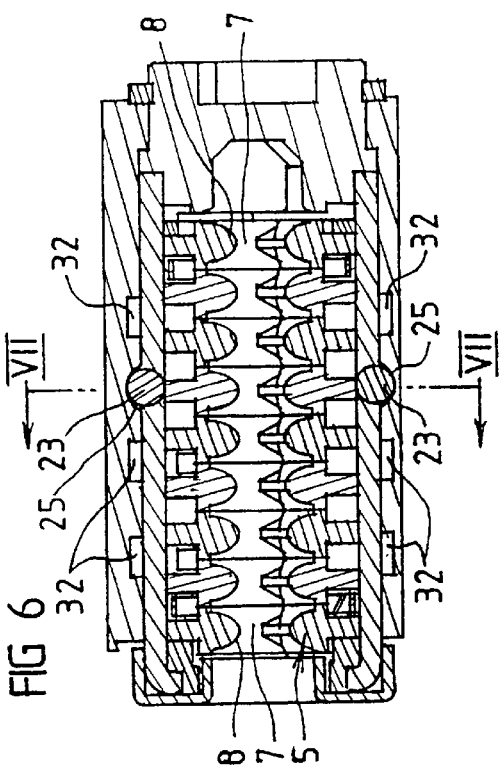
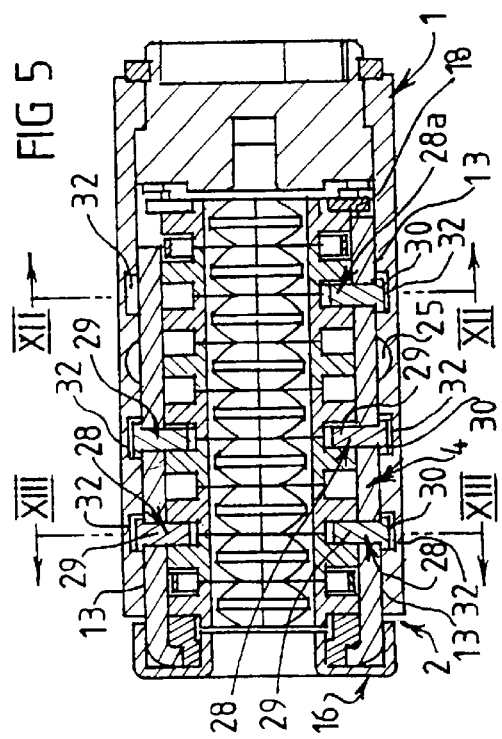

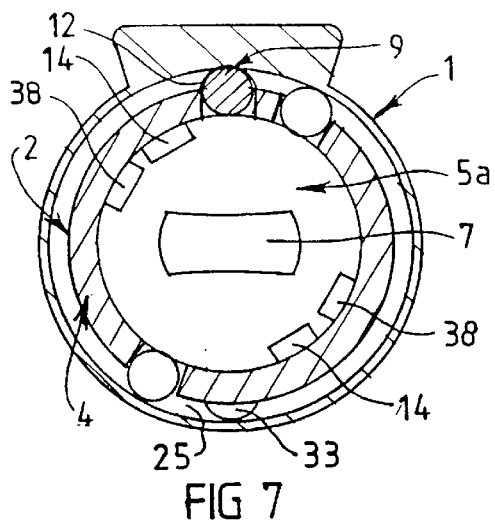 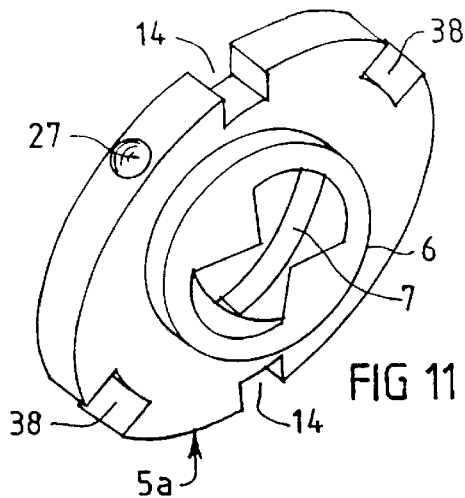
FIG 7
FIG 11
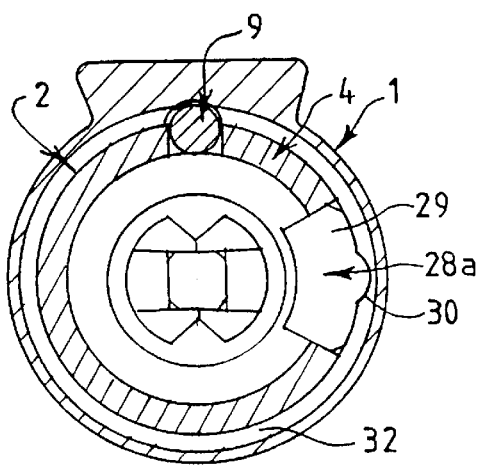 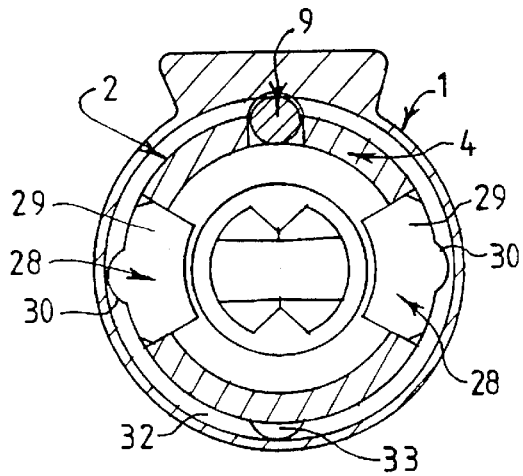
FIG 12
FIG 13
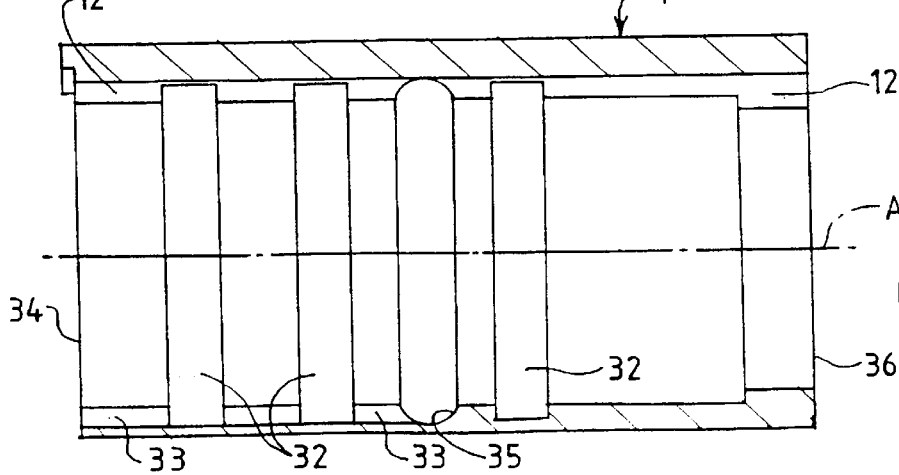
FIG 14

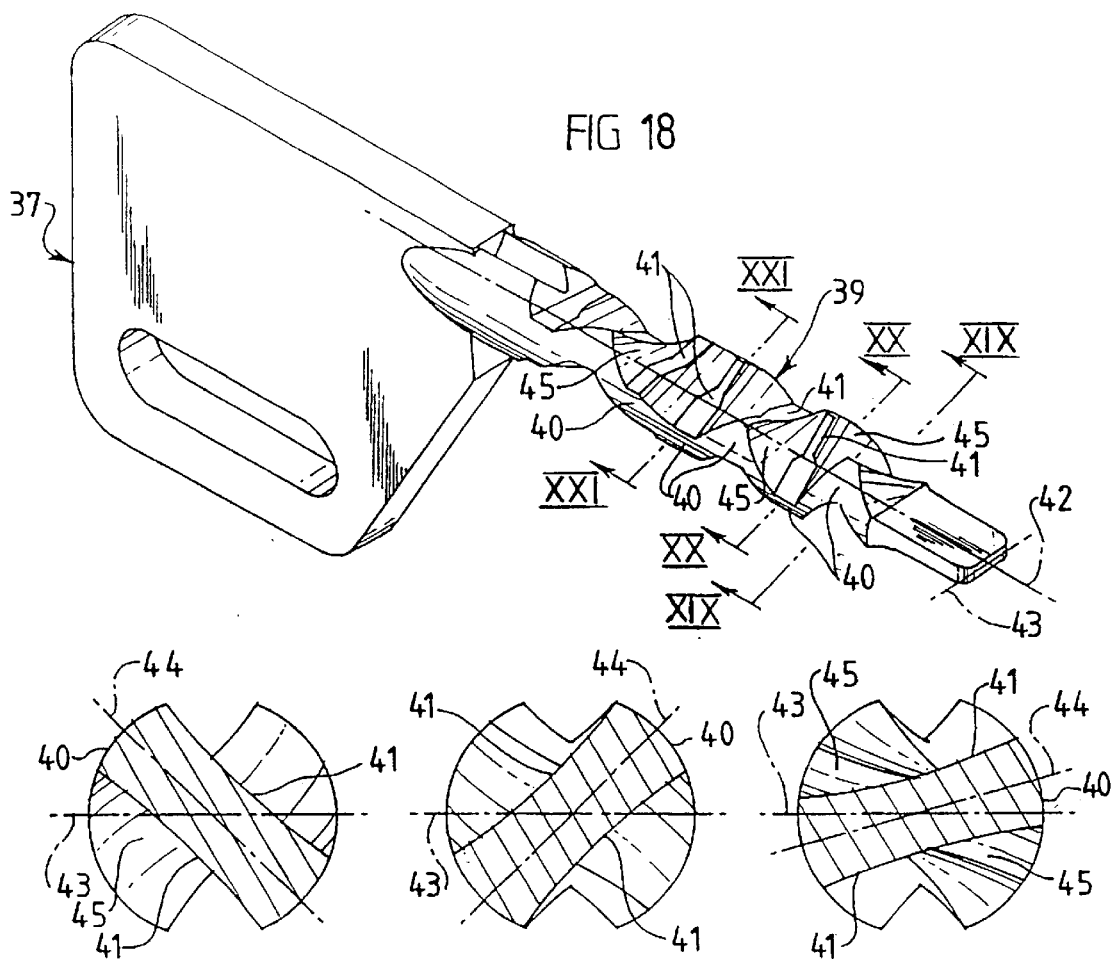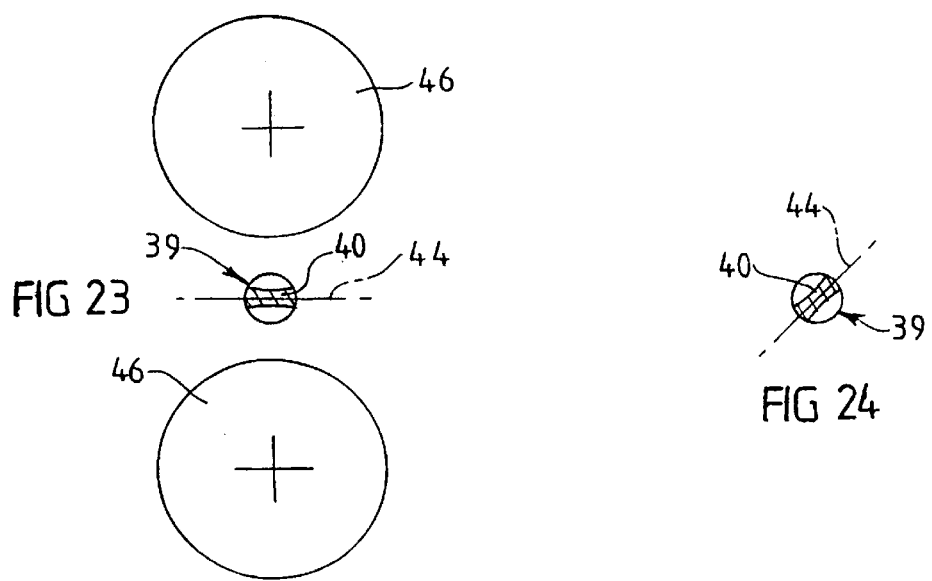

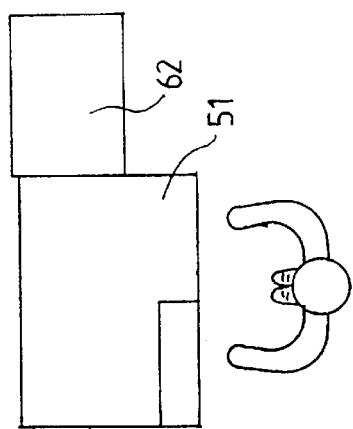
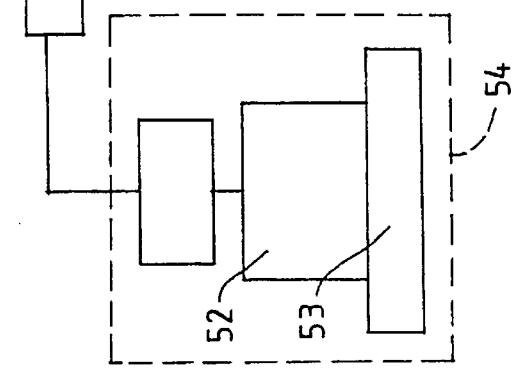
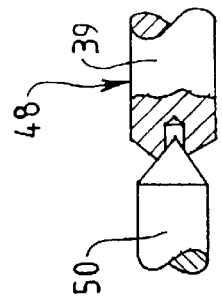
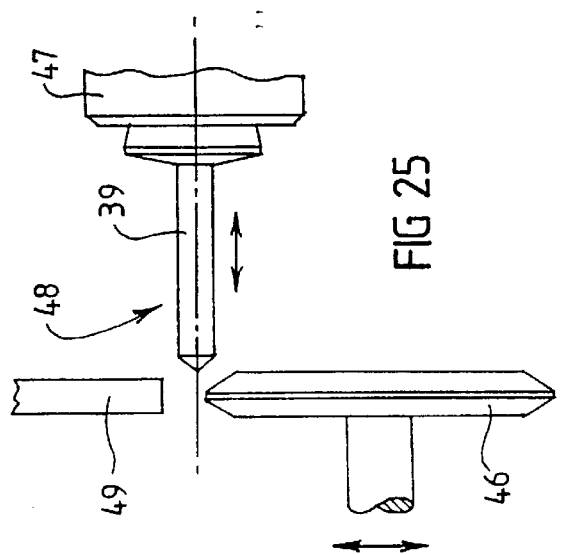
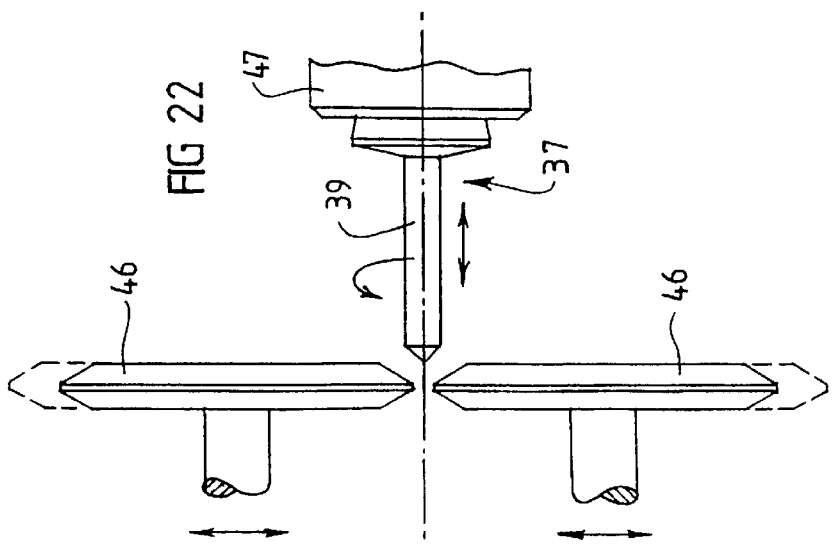

DISC TUMBLER LOCK AND KEY

BACKGROUND OF THE INVENTION

This invention relates to cylinder locks of the kind having a barrel rotatably mounted in an outer housing or cylinder, and also having key releasable means which functions to hold the barrel against rotation relative to the cylinder when a correct key is not located within the lock keyway. The invention is particularly concerned with such locks in which the key releasable means includes rotatable disc tumblers.

Locks of the foregoing kind are generally of relatively complex construction and include a large number of parts. As a consequence, such locks are relatively expensive to manufacture. Example locks of that kind are the subject of U.S. Pat. No. 4,512,166 (Dunphy 1) and U.S. Pat. No. 4,624,119 (Dunphy 2).

Many locks, including the Dunphy locks, include provision for changing the lock combination. Such a change generally involves removal of the lock barrel assembly and substitution by another barrel assembly which is responsive to a key different to that which operated the original barrel assembly. It is usually the case that the barrel change-over is achieved by use of a special change key, and that key functions in the required manner because of a feature which can be readily identified by visual inspection of the key. By way of example, in the case of the Dunphy lock the relevant feature is a particular configuration at the tip end of the key blade which is clearly observable and is relatively easy to duplicate.

SUMMARY OF THE INVENTION

It is an object of the present invention to provide a disc tumbler cylinder lock of relatively simple construction. It is a further object of the invention to provide such a lock having a barrel change-over facility which is of relatively simple form. It is yet another object of the invention to provide a barrel change-over facility which involves use of a special change key having an appearance not significantly different to that of the service key which is used to operate the lock under normal conditions. It is still another object of the invention to provide an improved method of forming a key for use with a disc tumbler cylinder lock. A further object of the invention is to provide an improved key for use with a disc tumbler cylinder lock. A still further object of the invention is to provide a key which is operable to permit removal of a barrel assembly from a cylinder lock and which has an appearance not significantly different to that of the service key for use with the same lock.

A disc tumbler lock according to one aspect of the invention is characterised in that it includes a side locking bar which is cooperable with one or more of the tumbler discs so as to be movable between lock and release positions at which the bar respectively prevents and permits rotation of the barrel assembly relative to the cylinder. When the side locking bar is in the lock position it extends across the separation plane between the lock barrel and the cylinder and thereby prevents rotation of the barrel relative to the cylinder. The bar is preferably held in that lock position by engagement with an outer peripheral surface of at least one of the tumbler discs. Each tumbler disc preferably has a recess in the outer peripheral surface which is adapted to receive part of the locking bar such that the bar can move radially inwards through a distance sufficient to adopt the release position at which the barrel can be rotated relative to the cylinder.

It is preferred that the tumbler discs are arranged in face to face relationship within a tubular sleeve or housing and that there is no intervening component such as a spacer plate between each two adjacent discs, at least in the majority of cases. It is further preferred that adjacent discs are arranged in face to face engagement.

A disc tumbler lock according to another aspect of the invention is characterised in that it includes barrel retention means which when active prevents removal of the barrel assembly from the lock cylinder, and which can be influenced into an inactive condition so as to thereby allow removal of the barrel assembly. It is a feature of the lock that at least one of the disc tumblers controls transfer of the barrel retention means between its active and inactive conditions.

It is preferred that a lock having such barrel retention means includes rotatable disc tumblers, and it is further preferred that the lock includes a side locking bar which is cooperable with one or more of the tumbler discs so as to be movable between lock and release positions at which the bar respectively prevents and permits rotation of the barrel assembly relative to the cylinder.

The tumbler discs may be arranged to respond to insertion of a key in substantially the same manner as the tumbler discs of the Dunphy locks. That is, insertion of the correct service key into the lock keyway causes each of the tumbler discs to adopt a rotational position at which the side locking bar can move to the release position and thereby permit rotation of the lock barrel relative to the cylinder.

The removable barrel assembly is rotatably mounted within a cylindrical bore of the cylinder and is movable axially through one end of that bore during a barrel change-over operation. The barrel retention means which controls the ability of the barrel assembly to be removed from the cylinder may include at least one detent which, when active, coacts between the cylinder and the barrel assembly to prevent axial movement of the barrel assembly through the aforementioned end of the cylinder bore.

It is preferred that at least one of the tumbler discs (hereinafter called the dual function disc) controls the condition of the aforementioned detent. The arrangement is preferably such that the dual function disc permits the detent to adopt the inactive condition when the disc has a particular rotational position (the second function position) relative to the or each other adjacent disc of the barrel assembly. That second function rotational position is preferably different to the rotational position (the service position) adopted by the dual function disc when the correct service key is inserted into the lock keyway.

In standard disc tumbler locks it is usually the case that each disc must have a single predetermined rotational position relative to each other disc in order to enable the barrel to be rotated relative to the cylinder. By contrast, in a lock according to the second aspect of the invention the barrel release disc has two such rotational positions, a first one of which is achieved by use of the correct service key, and the second of which is achieved by use of a special change key. It is preferred that the barrel detent is rendered inactive when the dual function disc adopts the second function rotational position, but remains active when the dual function disc adopts the service rotational position.

According to another aspect of the invention there is provided an apparatus for forming a key for use with a disc tumbler lock and which includes an elongate blade having tumbler indexing sections at locations spaced apart in the longitudinal direction of said blade, and a loping ramp surface between each two adjacent said indexing sections; the apparatus including a rotatable holding device to which a key blank can be releasably secured so that the elongate blade of that blank extends from the device and the longitudinal axis of said blade is substantially coincident with the axis of rotation of said device, forming means operable to treat the longitudinal surface of said blade and thereby form said indexing sections and said ramp surfaces, first drive means operable to cause rotation of said holding device about said axis of rotation, second drive means operable to cause relative movement between said device and said forming means in the direction of said axis of rotation, and control means operable to control the operation of each said drive means in accordance with a pre-selected sequence of operations which includes, operating said first and second drive means between each two successive indexing section forming operations so that said device moves through a predetermined angle of rotation and a predetermined amount of said relative movement occurs in the direction of said axis of rotation, and pausing operation of said first drive means during each said indexing section forming operation.

According to yet another aspect of the invention, there is provided a method of forming a key for use with a disc tumbler lock and which includes an elongate blade having a plurality of tumbler indexing sections and a plurality of sloping ramp surfaces arranged in alternating sequence along at least part of the length of said blade; the method including the steps of;

releasably securing a key blank to a rotatable holding device so that the elongate blade of the blank extends from the device and the longitudinal axis of said blade is substantially coincident with the axis of rotation of said device;

selecting a sequence of operations from a plurality of pre-established sequences of key forming operations, each of which includes, successively forming each of a plurality of said indexing sections on said blade at respective locations which are spaced apart in the longitudinal direction of said blade, forming a said ramp surface on said blade between each successive said indexing section forming operations, holding said blade against movement about said axis of rotation during each said indexing section forming operation, and moving said blade about said axis of rotation through a predetermined angle of rotation during each said ramp surface forming operation;

and causing said apparatus to proceed automatically through said selected sequence of operations.

It is preferred that each indexing section is formed by two forming tools such as rotatable cutters which are located on respective opposite sides of the blade of a key blank and are moved towards one another when forming an indexing section on that blade. It is further preferred that the key blank is rotated about the longitudinal axis of the blade after each indexing section is formed so that the rotational position of the blade is different at each successive indexing section forming operation. It is of course possible that the rotational position of the key blank may be the same during two or more of the indexing section forming operations.

Rotation of the key blank may be electronically controlled by control means which is selectively programmable to establish a series of successive preselected rotational positions for the key blank during the blade forming operation. It is further preferred that electronic control means determines the position along the length of the blade at which each indexing section is formed. The forming tools and/or the key blank may be moved in the longitudinal direction of the blade to achieve the correct relative position at which an indexing section forming operation is to take place.

A key according to the invention is characterised in that it includes an elongate blade having a plurality of tumbler indexing sections arranged in spaced relationship in the longitudinal direction of the blade. Each indexing section is adapted to cooperate with a respective rotatable disc tumbler of a cylinder lock and is operative to cause that tumbler to adopt a rotational position at which the lock is released. At least two of the indexing sections have a different angular disposition as hereinafter defined, and at least one of the indexing sections is operative to control the rotational position of a tumbler and also control barrel retention means which is operative to prevent removal of the barrel assembly from the cylinder body of the lock. It is preferred that the last mentioned indexing section is located between two other indexing sections.

The angular disposition of one indexing section relative to another is the angular relationship between a median plane of one section and the corresponding plane of the other, and in each case the median plane contains the longitudinal axis of the key blade.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

BRIEF DESCRIPTION OF THE DRAWINGS

FIG. 1 is a semi-diagrammatic exploded view of a lock according to one embodiment of the invention, and some matters of detail have been omitted from that view for convenience of illustration.

FIG. 2 is an end view of the assembled lock shown by FIG. 1.

FIG. 4 is a cross-sectional view taken along line IV—IV of FIG. 2.

FIG. 5 is a cross-sectional view taken along line V—V of FIG. 2.

FIG. 6 is a cross-sectional view taken along line VI—VI of FIG. 2 and showing the lock in the locked condition.

FIG. 7 is a cross-sectional view taken along line VII—VII of FIG. 6 and showing the lock in the locked condition.

FIG. 11 is a perspective view of a special dual function disc which is used in one embodiment of the invention.

FIG. 12 is a cross-sectional view taken along lines XII—XII of FIG. 5.

FIG. 13 is a cross-sectional view taken along line XIII—XIII of FIG. 5.

FIG. 14 is a longitudinal cross-sectional view of the lock body of one embodiment of the invention.

FIG. 18 is a perspective view of a special change key of the kind referred to in relation to FIGS. 16 and 17.

FIG. 19 is a cross-sectional view, on an enlarged scale, taken along line XIX—XIX of FIG. 18.

FIG. 20 is a cross-sectional view, on an enlarged scale, taken along line XX—XX of FIG. 18.

FIG. 21 is a cross-sectional view, on an enlarged scale, taken along line XXI—XXI of FIG. 18.

FIG. 22 is a diagrammatic view of one form of apparatus for manufacturing a key for use with a lock as shown by FIG. 1.

FIG. 23 is a diagrammatic representation of the manner in which the apparatus of FIG. 22 operates.

FIG. 24 is a cross-sectional view of a partially formed key blade which has been treated by the apparatus of FIGS. 22 and 23.

FIG. 25 is a view similar to FIG. 22 but showing an alternative form of apparatus.

FIG. 26 is a diagrammatic view of one form of support for a key blank being treated by the apparatus of FIG. 25.

FIG. 27 is a diagrammatic view of programmable key forming apparatus in accordance with one embodiment of the invention.

DETAIL DESCRIPTION

Figure 3:
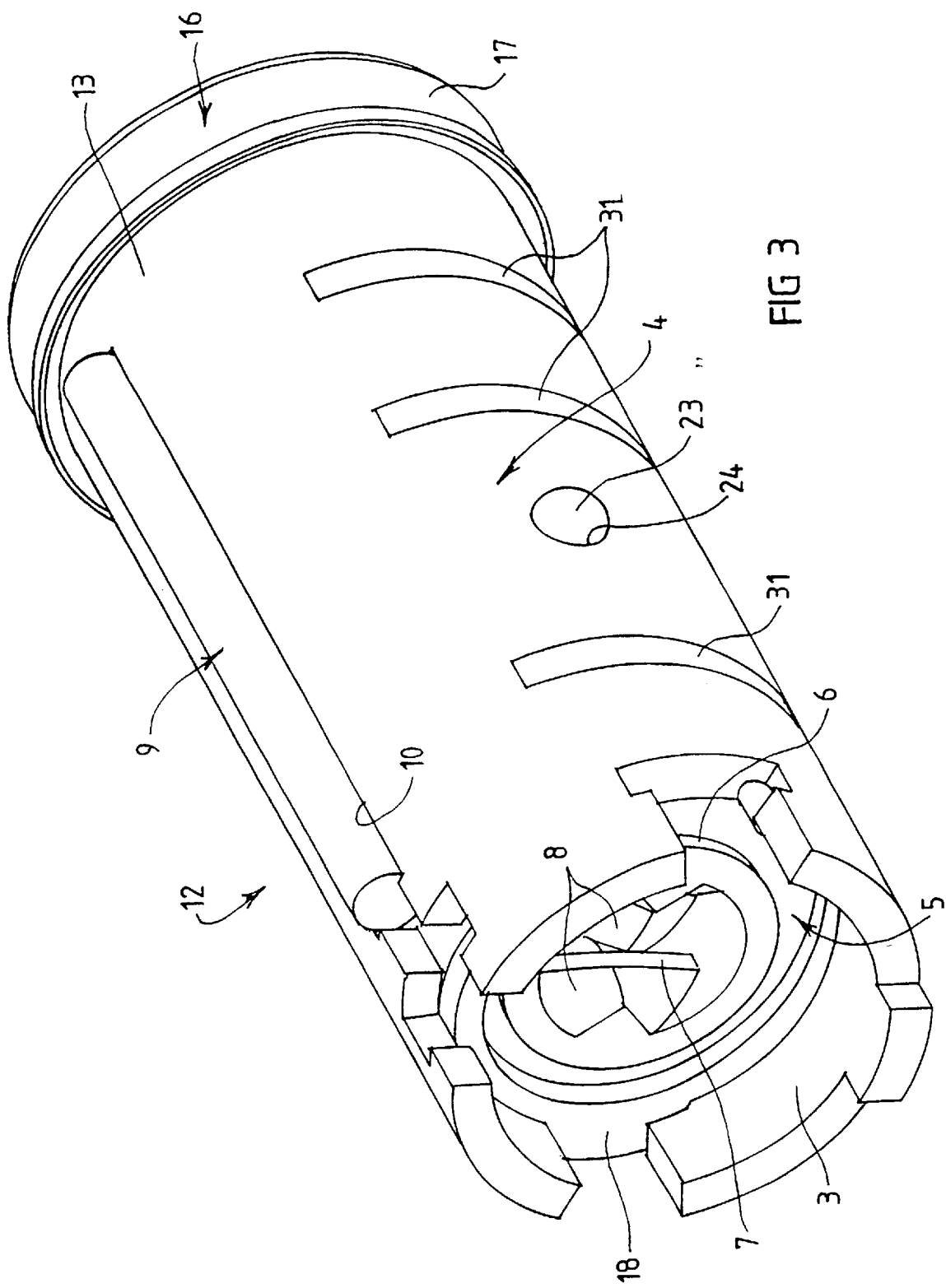
FIG. 3 is a perspective view of the barrel assembly of the lock shown by FIGS. 1 and 2.

The lock includes a cylinder body 1 and a barrel assembly 2 which is adapted to be rotatably mounted in a cylindrical bore 3 of the body 1 as illustrated diagrammatically by the cross-sectional views forming FIGS. 4 to 7. In the particular arrangement shown the barrel assembly 1 includes a cylindrical tubular sleeve 4 which rotatably locates within the bore 3, and a plurality of tumbler discs 5, each of which is rotatably mounted within the sleeve 4. The arrangement shown by the drawings includes nine discs 5, but the number could be less or greater, depending on requirements. The barrel assembly 2 is rotatable about axis A (FIG. 4) relative to the body 1, and the tumbler discs 5 are rotatable about axis A relative to the sleeve 4.

Each disc 5 is preferably circular as shown and has an axial boss 6 of reduced diameter extending a short distance from each side. It is to be understood however, that the bosses 6 are not essential and that a disc 5 may be provided with a single boss 6 rather than two as shown. A keyway opening 7 extends axially through each disc 5, and that opening will have a shape such as to suit the key intended to be used with the lock. At least one cam face 8 (FIG. 6) is provided at the disc end surface adjacent the opening 7, and in that respect each disc 5 may be similar to the tumbler discs described in the Dunphy patents. That is, it is preferred that the discs 5 are arranged so as to coact with a key in the same general manner as that described in the Dunphy patents, which description is to be read into the present specification by cross-reference.

A side locking bar 9 (FIG. 3) is provided in the particular barrel assembly 2 shown, and that bar 9 cooperates with both the cylinder body 1 and the tumbler discs 5 in a manner such as to control the ability of the barrel assembly 2 to be rotated relative to the cylinder body 1. The locking bar 9, is shown as a cylindrical rod-like member, but it is to be understood that other forms could be adopted in a lock according to the invention. The locking bar 9 is located within an appropriately dimensioned slot 10 which, as best seen in FIG. 1, is formed through the wall of the sleeve 4 and extends longitudinally of that sleeve.

As best seen in FIG. 4, the bar 9 is arranged to rest on the outer cylindrical surface 11 of each tumbler disc 5 so as to adopt the lock position which is shown by FIG. 7. When the bar 9 is in that lock position it locates within a groove 12 (FIGS. 2, 4 and 7) formed in the surrounding surface of the cylinder bore 3. It will be apparent that when the bar 9 is in that lock position it extends across the plane of separation between the body 1 and the assembly 2 and thereby coacts with both the cylinder body 1 and the sleeve 4 so as to prevent relative rotation of the barrel assembly 2.

Rotation of the barrel assembly 2 relative to the cylinder body 1 is not possible unless the bar 9 is moved radially inwards of the sleeve 4 so that the cylindrical surface of the bar 9 does not project beyond the cylindrical outer surface 13 of the sleeve 4. Such movement is made possible when each of the discs 5 has a predetermined rotational position relative to the sleeve 4 as hereinafter described, and that rotational position will be referred to as the service position.

Each disc 5 has at least one recess 14 (FIGS. 1 and 7) formed in the cylindrical outer surface 11, and each recess 14 is dimensioned and shaped so as to receive a portion of the bar 9 and allow that bar to move radially inwards to an extent sufficient to free the barrel assembly 2 for rotation relative to the body 1. It is preferred, as shown by FIG. 7, that the groove 12 of the cylinder body 1 has sloping side surfaces which assist the bar 9 to be cammed out of the groove 12 as hereinafter described. It is further preferred that each disc 5 has two recesses 14 located 180° apart. In the particular lock shown the discs 5 are capable of 360° rotation relative to the sleeve 4, whereas insertion of a key into the lock will cause each disc 5 to rotate through an angle less than 360°. It is therefore necessary to provide two recesses 14 to ensure that the key can cause either one of those recesses to be correctly positioned to receive the locking bar 9.

Any appropriate means may be employed to retain the bar 9 against complete separation from the barrel sleeve 4. Also, any appropriate means may be employed to retain the discs 5 in assembly with the sleeve 4. In the particular arrangement shown, such disc retaining means includes an end cap 16 which fits over an outer end of the barrel sleeve 4 as shown by FIGS. 2 and 3. An outer circumferential wall 17 of the cap 16 overlies an end portion of the sleeve 4 as best seen in FIG. 4, and a spacer 15 is located between the cap 16 and the adjacent disc 5. The end cap 16 serves to prevent escape of the discs 5 through a front end of the sleeve 4, and a spring clip 18 serves to retain the discs 5 against escape through the back end of the sleeve 4. The end cap 16 has an opening 19 for passage of a key into the lock keyway.

When the correct service key is fully inserted into the lock keyway each of the discs 5 will have a rotational position (the service position of rotation) such that the disc recesses 14 are aligned in the axial direction of the barrel assembly 2. Furthermore, the aligned recesses 14 will be positioned directly beneath the locking bar 9. Under those circumstances, rotational torque applied to the barrel assembly 2 causes the bar 9 to be cammed out of the groove 12 to locate within the aligned recesses 14. As a consequence, the barrel assembly 2 can be rotated through a distance sufficient to operate a latch bolt or deadbolt, for example, to which the lock is connected.

Figure 8:
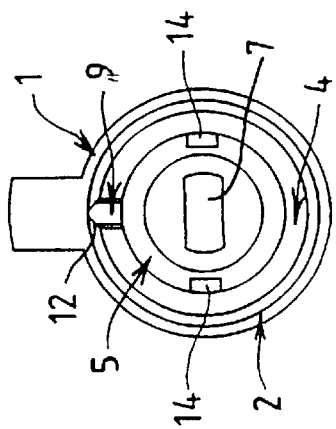
FIG. 8 is a diagrammatic view showing the lock in a locked condition.
Figure 9:
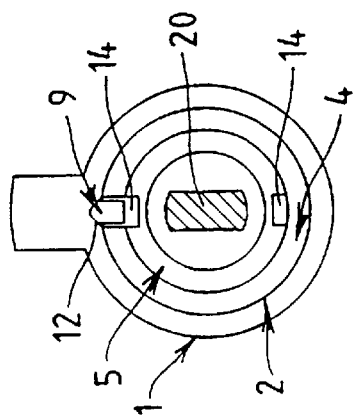
FIG. 9 is a view similar to FIG. 8 but showing a standard disc tumbler rotated, by the service key, to a position at which the side locking bar is rendered inoperative.
Figure 10:
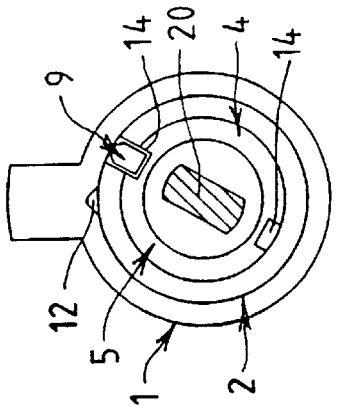
FIG. 10 is a view similar to FIG. 9 but showing the barrel assembly rotated away from the locked condition shown by FIG. 8.

FIGS. 8 to 10 diagrammatically illustrate the operation of the lock as described above. Only one of the discs 5 is shown in each of those Figures, and that is a standard disc 5 as distinct from the special disc 5(a) which is shown by FIG. 7 and which will be hereinafter explained. FIG. 8 shows the lock without a key in the keyway openings 7 of the discs 5, and it is to be understood that each disc 5 other than the particular disc shown may have a rotational position different to that shown by FIG. 8. FIG. 9 shows a service key 20 inserted into the keyway, and that results in each of the disc recesses 14 being aligned as described above. FIG. 10 shows the barrel assembly 2 rotated by means of the service key 20.

Any suitable means may be adopted to bias the locking bar 9 radially outwards and cause it to relocate in the cylinder groove 12 when the barrel assembly 2 is returned to the rotational position shown by FIG. 8. In the particular arrangement shown that biasing means is formed by two circular springs 21, each of which is positioned within the sleeve 4 to press outwardly against the underside of the bar 9 as shown in FIG. 4.

It is preferred that the lock is arranged to permit removal of the barrel assembly 2 for repair or replacement. In the arrangement shown, the barrel assembly 2 is adapted to be moved into and out of the cylinder bore 3 by way of the outer end 22 (FIG. 1) of the body 1. Removal of the barrel assembly 2 from the cylinder body 1 is normally prevented by barrel retention means, which in the example shown includes at least one movable detent 23 arranged for movement between an active condition at which removal of the barrel assembly is prevented, and an inactive condition at which such removal is permitted, subject perhaps to other conditions being satisfied as hereinafter discussed. In the particular arrangement shown, the detent 23 is in the form of a ball which is preferably made of metal, but detents of other forms (e.g., a roller) could be used and materials other than metal could be used. The detent ball 23 is carried within a suitably shaped pocket 24 (FIG. 1) formed in the barrel sleeve 4 so as to be retained against relative movement in both the axial and circumferential directions of the sleeve 4. On the other hand, the ball 23 is able to move radially relative to the sleeve 4.

The detent ball 23 has an active condition when it bridges the separation plane between the cylinder bore 3 and the barrel sleeve 4 as shown in FIG. 6. In the particular arrangement shown, less than fifty percent of the ball 23 is normally located within a circumferentially extending groove 25 formed in the cylinder bore 3, and as shown by FIGS. 6 and 7, the ball 23 is retained within that groove by engagement with the outer cylindrical surface 11 of one of the discs 5. That particular disc will be hereinafter referred to as the "dual function disc" and will be identified by the reference "5(a)". When the ball 23 is in the active condition as shown by FIGS. 6 and 7, axial movement of the barrel assembly 2 out of the cylinder bore 3 is prevented by engagement between the ball 23 and a side of the groove 25.

The particular disc tumbler 5(a) shown by FIG. 11 has a recess 27 which is dimensioned and shaped to receive part of the ball 23. The arrangement is such that when the ball 23 locates within the recess 27 it no longer projects into the circumferential groove 25 and is thereby rendered inactive.

Figure 15:
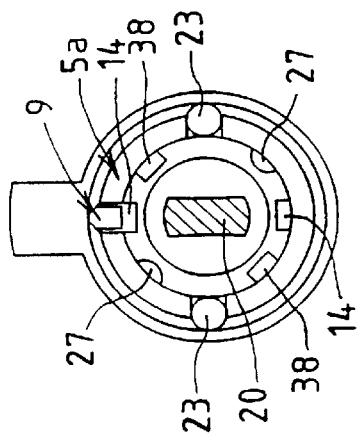
FIG. 15 is a view similar to FIG. 8 but showing a dual function disc rather than the standard disc tumbler shown by FIGS. 8 to 10, and which also shows use of a service key as shown in FIGS. 9 and 10.
Figure 16:
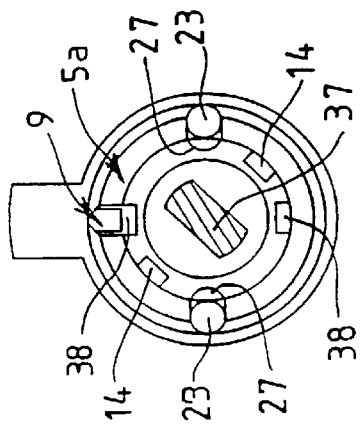
FIG. 16 is a view similar to FIG. 15 but showing use of a special change key which enables the side locking bar to be rendered inoperative and simultaneously enables release of movable detents which prevent axial removal of the barrel assembly from the lock body.
Figure 17:
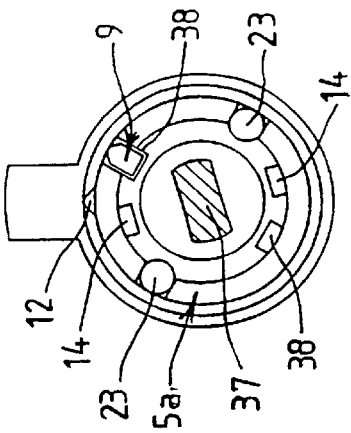
FIG. 17 is a view similar to FIG. 16 but showing the barrel assembly rotated away from the locked position shown in FIG. 16.

As a result, the barrel assembly 2 is freed to be moved axially out of the cylinder bore 3, but in the preferred arrangement hereinafter described that is subject to other conditions being satisfied. The recess 27 may be a part spherical depression as shown by FIG. 11, or it may be an axially extending groove of part cylindrical shape, or any other suitable shape, as shown by FIGS. 15 to 17. It is preferred that the recess 27 has a shape such that it cannot receive the locking bar 9, or at least a significant part of that bar.

The recess 27 may be omitted in another version of the disc 5(a) which is shown by FIG. 7 and which will be hereinafter explained.

In the particular arrangement shown by the drawings the lock includes two detent balls 23, each of which is carried by the sleeve 4 in diametrically opposed relationship. Two similarly disposed recesses 27 are therefore provided in the version of the disc 5(a) as shown by FIGS. 11 and 15 to 17.

It is preferred that the barrel retention means includes at least one fixed detent 28 in addition to the movable detent balls 23. In the particular arrangement shown, there are five fixed detents 28 (FIGS. 1 and 5), but the number could be less or greater, according to requirements. Each detent 28 is fixed to or formed integral with the sleeve 4 so as to project outwardly beyond the outer surface 13 of the sleeve 4.

The detents 28 can be of any suitable form, but in the arrangement shown each is formed separate from the sleeve 4 and has a body 29 and a projection 30. The body 29 of each detent 28 is located within a respective one of a number of circumferential slots 31 (FIG. 1) formed through the wall of the sleeve 4, and is secured to that wall in any suitable manner so that the projection 30 of the detent 28 projects beyond the sleeve surface 13 as best seen in FIG. 5.

In the particular arrangement shown, three detents 28 are located at one side of the sleeve 4 and are arranged in spaced apart relationship along a line extending parallel to the rotational axis A. Another two detents 28 are located at the other side of the sleeve 4, and those two detents 28 are also spaced apart along a line extending parallel to the rotational axis A. Preferably, the two lines of detents 28 are 180° apart around the circumference of the sleeve 4 as shown by FIG. 13. It is also preferred that each detent 28 of the group of two is in circumferential alignment with a respective one of two adjacent detents 28 of the group of three. The non-aligned detent 28 of the group of three will be hereinafter identified by the reference numeral "28a".

Each of the detents 28 is slidable within a circumferential groove 32 formed in the surface of the bore 3. Because of the grouping of the detents 28 as described above, three circumferential grooves 32 are provided in the body 1 of the particular arrangement shown, and those grooves 32 are spaced apart in the axial direction of the body 1 so that each is positioned opposite a respective one of the three slots 31 of the sleeve 4 as shown by FIG. 1.

It will be appreciated that because of the fixed nature of the detents 28, axial movement of the barrel assembly 2 out of the body 1 is not possible so long as any one of the detents 28 remains confined within its respective tracking groove 32. At least one barrel release groove 33 is therefore formed in the surface of the bore 3 so as to extend in the axial direction of that bore. Because of the particular grouping of the detents 28 described above, the particular lock illustrated in the accompanying drawings has two barrel release grooves located 180° apart around the circumference of the bore 3. In the construction shown, the locking bar groove 12 doubles as one of the barrel release grooves, but other arrangements could be adopted. Both grooves 12 and 33 are dimensioned to slidably receive a detent projection 30.

Removal of the barrel assembly 2 from the lock body 1 is only possible when each of the detent projections 30 is in longitudinal alignment with one of the grooves 12 and 33. It is preferred however, that removal of the barrel assembly 2 is possible at only one position of rotation of that assembly, which will be hereinafter referred to as the barrel removal position. That result can be achieved in a number of ways, but in the arrangement shown it is achieved by limiting the longitudinal length of the groove 33 so that the detent 28a is unable to enter that groove (FIGS. 4 and 14).

In the arrangement shown, the locking bar groove 12 extends through both ends of the body 1, whereas the groove 33 only extends through the outer end 34 (FIGS. 1 and 14) of that body. A longitudinally inner blind end 35 (FIG. 14) of the groove 33 is positioned longitudinally outwards from the circumferential groove 32 within which the projection 30 of the detent 28a tracks. That is, the detent 28a is positioned between the groove blind end 35 and the inner end 36 of the body 1.

The arrangement is therefore such that the longitudinal groove 12 intersects with each of the three circumferential grooves 32, whereas the longitudinal groove 33 intersects with only two of the three circumferential grooves 32. As a result, it is only possible to move the barrel assembly 2 axially out of the body 1 through the outer end 34 thereof, when the projection 30 of the detent 28a is in longitudinal alignment with the groove 12.

A special change key 37 (FIGS. 16 and 17) is used to cause the disc 5(a) to adopt a rotational position at which each ball 23 can enter a respective one of the recesses 27. When the service key 20 is used, the disc 5(a) has the rotational position shown by FIG. 15 at which the barrel assembly 2 is released for rotation relative to the body 1. The detent balls 23 however, remains held within the groove 25 and thereby prevents relative axial movement of the barrel assembly 2. When the special key 37 is used as shown by FIG. 16, the rotational position of the disc 5(a) is different to that shown by FIG. 15. In particular, each recess 27 is positioned to receive a respective one of the balls 23, whereas that is not the case when the service key 20 is used. On the other hand, the special key 37 is preferably such that in the FIG. 16 condition each of the discs 5 other than the dual-function disc 5(a) has the same rotational position (the service position) as it has when the service key 20 is used.

Since the FIG. 16 rotational position of the disc 5(a) is different to the FIG. 15 condition, the recess 14 of the disc 5(a) will not be correctly positioned relative to the locking bar 9. It is therefore necessary to make provision whereby the locking bar 9 can move into the release position when the disc 5(a) is in either the FIG. 15 rotational position or the FIG. 16 rotational position. That is, the disc (5a) must have a second service position, or a second group of service positions. In the particular arrangement shown that is achieved by providing the disc 5(a) with a peripheral recess 38 which corresponds to the recess 14 in size and shape, and which is positioned beneath the locking bar 9 in the FIG. 16 condition. Thus, when the lock is in the FIG. 16 condition it is possible to rotate the barrel assembly 2 relative to the cylinder body 1 (FIG. 17) and thereby rotate the assembly 2 to the barrel release position as referred to above, at which it is possible to move the assembly 2 axially out of the cylinder bore 3.

It will be apparent that the recesses 14 and 38 need not be separated as shown, but they could be combined to form a single recess having sufficient circumferential breadth to permit operation of the lock as described above. Furthermore, each of the disc recesses 14, 27 and 38 may be duplicated as shown in the accompanying drawings, and there may be two detents 23 as also shown in the drawings.

Summarising the foregoing, barrel removal cannot be achieved by use of the service key 20 because that key cannot position the disc (5a) to enable release of the movable detents 23. Such positioning of the disc (5a) is achieved by use of the change key 37, and in the arrangement described the side locking bar is rendered inoperative at that rotational position of the disc (5a). But further manipulation of the lock is necessary to achieve axial withdrawal of the assembly 2, and that involves turning the key 37 from the initial fully inserted position to rotate the assembly 2 to the barrel release position at which the various detent projections 30 are each aligned with either one of the grooves 12 and 33. Furthermore, in the construction described, such withdrawal of the assembly 2 is subject to the detent 28a being aligned with the groove 12.

The dual function disc 5(a) as shown in FIGS. 11 and 15 to 17 has three pairs of peripheral recesses, each of which pair includes two recesses. That is, there are two pairs of side bar recesses namely, the recesses 14 and 38—and there is a pair of detent recesses 27.

FIG. 7 shows another form of dual function disc 5(a) which has only two pairs of recesses. One pair, the recesses 14, has two functions. When the disc 5(a) is positioned by means of the service key 20, one of the recesses 14 is able to receive part of the side locking bar 9 and thereby release the barrel assembly 2 for rotation relative to the lock body 1. When the disc 5(a) is positioned by means of the change key 37, each of the recesses 14 is located in radial alignment with a respective one of the detent balls 28, and one of the recesses 38 is positioned to receive part of the side locking bar. The disc 5(a) is therefore able to deactivate the side locking bar and the detent balls 28 by having only two pairs of surface recesses rather than three as in the FIG. 11 arrangement.

One advantage of the FIG. 7 arrangement is that it will be very difficult to distinguish the dual function disc 5(a) from standard discs 5 in circumstances where each standard disc 5 has two pairs of surface recesses. Standard discs 5 of that kind may be adopted in a master keyed system. That is, one pair of recesses would be active during service key operation, and the other pair would be active during master key operation. The angular spacing (circumferential) between the service and master key recesses of each such standard disc 5 is preferably different to the angular spacing between the recesses 14 and 38 of a dual function disc 5 (a). Also, that angular spacing of the standard disc 5 need not be the same between two or more of the standard discs 5 of a lock.

Each of the keys 20 and 37 may be identical save for that section of the key blade which controls the rotational position of the barrel release disc 5(a). It is therefore difficult to visually determine the characteristic of the key 37 which enables it to be used for barrel change-over purposes, and that increases the security of the lock system. The keys 20 and 37 may be of substantially the same form as the keys disclosed by the Dunphy patents, except that the key blades need not have a tip end configuration or other special arrangement as referred to in the Dunphy patents.

FIGS. 18 to 21 show a special change key 37 which is similar to the key disclosed by the Dunphy patents. The elongate blade 39 of the key 37 as shown is basically of cylindrical form, but other cross-sectional shapes could be adopted for the blade 39. The blade 39 is machined or otherwise treated, preferably by a material removal process, to create a plurality of tumbler indexing sections 40 which are spaced apart in the longitudinal direction of the blade 39. In the particular arrangement shown, each indexing section 40 has two oppositely facing surfaces 41 which are located on respective opposite sides of the blade axis 42. The cross-sectional shape of each section 40 is substantially the same as is evident from FIGS. 19 to 21, and that shape is such as to allow passage of the key blade 39 through the tumbler disc openings 7.

The indexing sections 40 must be arranged so that the key 37 is able to manipulate the tumbler discs 5 so that the disc recesses 14 and 38 are aligned as previously discussed and therefore able to receive the locking bar 9. For that purpose each section 40 must have a particular angular disposition relative to a datum plane 43 so that the tumbler disc 5 controlled by that section 40 adopts the appropriate rotational position relative to each other disc. The angular disposition is the angular disposition between the datum plane 43, which can be arbitrarily selected, and a median plane 44 of the relevant section 40. The median plane 44 is disposed substantially midway between the section surfaces 41 and contains the blade axis 42. Each of FIGS. 19 to 21 is a cross-sectional view of a respective one of three indexing sections 40 of the blade 39, and it will be seen that in each case the section median plane 44 has a different angular relationship to the datum plane 43. It is nevertheless possible that the angular relationship may be the same for two or more indexing sections 40 of a particular key.

A service key intended to operate the same lock as that for which the key 37 of FIG. 18 is designed, may have an appearance not significantly different to that of the key 37. Indeed, there need be only one difference between the two keys, and that difference will not be easy to detect by visual inspection. If it is assumed that the indexing section 40 shown by FIG. 19 is the section which controls the dual function disc 5(a), the angular disposition of the corresponding section of the service key 20 will be different to that shown by FIG. 19, and that may be the only difference between the two keys. The angular disposition shown by FIG. 19 will be selected to align the recess 38 of the disc 5(a) with the recesses 14 of the other discs 5, whereas the angular disposition of the same section 40 of the service key 20 will be selected to align the recess 14 of the disc 5(a) with the recesses 14 of the other discs 5.

The indexing sections 40 and adjacent sloping ramp surfaces 45 of the profiled blade 39 may be formed in any suitable manner. According to one method as shown diagrammatically by FIG. 22, two circular cutters 46, or other suitable surface forming tools, are arranged for movement towards and away from one another in a radial direction. Each cutter 46 is adapted to form a respective one of the surfaces 41 of an indexing section 40 as shown diagrammatically by FIG. 23. Prior to commencement of the key blade cutting operation the cutters 46 are positioned relative to one another as shown by FIG. 22 so as to form a cut of the required depth in the cylindrical surface of the key blade 39. The key 37 is held by a rotatable chuck 47 which is mounted to permit the key blade 39 to be moved longitudinally into the space between the cutters 46. The chuck 47 is turned about its rotational axis as the blade 39 is moved longitudinally between the cutters 46, thereby producing the twisted tracks which are evident in FIG. 18. The direction of rotation of the chuck 47 may be reversed on one or more occasions during the track forming process.

Rotation of the chuck 47 is halted briefly during formation of each indexing section 40, and is then recommenced as the cutters 46 travel beyond the relevant section 40 to form an associated track ramp surface 45 which reacts with the discs 5 to cause disc rotation. On the other hand, it is preferred that longitudinal movement of the blade 39 relative to the cutters 46 continues uninterrupted during the entire blade forming process.

At completion of the blade cutting operation the cutters 46 may be moved apart as represented by the broken lines in FIG. 22 so that the key blade 39 can be withdrawn from its location between the cutters 46.

FIG. 25 shows a variation of the arrangement shown by FIG. 22. That variation is intended to operate in essentially the same manner as the FIG. 22 arrangement, except for such changes as are necessary because of the use of one forming tool as against two forming tools. The key blank 48 shown in FIG. 25 is not the only form of key blank to which the invention can be applied, and the cutter or other forming tool 46 need not have the particular configuration shown by FIG. 25. By way of example, the key blank may be a cylindrical rod, and a key head may be secured to one end of that rod after the blank 48 has been treated by the key forming apparatus.

Although FIG. 25 shows the use of a rotary cutter type of forming tool, it needs to be understood that other types of tools could be adopted. By way of example, the or each forming tool could be an end milling cutter or similar tool. Furthermore, the key blade configuration could be formed by laser cutting or any other suitable forming technique.

In the example arrangement shown, the blade 39 of the key blank 48 is of substantially cylindrical form, and it is intended to treat the blade 39 by the tool 46 so as to form indexing sections 40 and ramp surfaces 45 of the general kind previously described. For that purpose, the key blank 48 is movable axially relative to the tool 46 (which is rotatable), and the tool 46 is movable transverse relative to the blade 39 as shown by the arrows in FIG. 25.

As shown by FIGS. 19 to 21, the example key referred to requires the presence of two corresponding indexing surfaces 41 on respective opposite sides of the blade 39. It will normally be the case that two or more pairs of such surfaces 41 will be provided at spaced intervals along the length of the blade 39. It is therefore necessary that the blade 39 be rotated through 180° to enable the tool 46 of the FIG. 25 arrangement to form each of the surfaces 41 of each indexing section 40, and the tool 46 will be moved laterally outwards clear of the blade 39 to enable such rotation to take place. Any suitable control means, such as a computer controlled system as hereinafter described can be employed to ensure accurate formation of each of the sections 40. That same system may ensure accurate formation of the ramp surfaces 45 which intervene between adjacent, but axially spaced, indexing sections 40.

Thus, when forming a key blade 39 by means of the FIG. 25 arrangement, each of two series of alternating indexing and ramp surfaces 41 and 45 respectively, is formed at a time different to that at which the other series is formed. That is, after formation of one of the two series the blade 39 and the tool 46 are re-positioned to enable formation of the second series. Formation of each series may commence at the outer tip end of the blade 39, but that is not essential, nor is it essential that each series be commenced at or adjacent the same end of the blade 39. It is preferred that each series is formed without interrupting the relative longitudinal movement between the blade 39 and the tool 46. On the other hand, relative rotation of the blade 39 will be occasionally paused and may be reversed on one or more occasions.

In the FIG. 25 arrangement, it may be desirable to support the blade 39 against deflection during a forming operation. By way of example, the blade 39 may be supported at the side opposite to that engaged by the tool 46 during a forming operation. An example support 49 is shown by FIG. 25, and the support 49 could be fixed or movable according to requirements. By way of example, the support 49 may be movable towards and away from the axis of the blade 39. If the support 49 is movable, that movement may be controlled by the system which controls movement of the tool 46. The same system may also control axial movement of the key blank 48.

The blade 39 could be supported in any of a variety of ways, including use of an end center support 50 similar to those commonly mounted on the tail-stock of lathes. Such an arrangement is shown by FIG. 26. If desired, an end center support 50 could be used together with a side support 49 as referred to above.

The blade cutting operation can be controlled in any suitable manner, but it is preferred that the control system is electronic in nature. The blade cutting machine may be programmable to enable formation of any of a group of predetermined key blade profiles, each of which is useable with a specific series of discs 5. With reference to the FIG. 22 arrangement, the electronic control system may regulate rotation of the cutters 46 and movement of those cutters towards and away from one another. It may also control longitudinal movement of the key blade 39 through the cutters 46, and the direction and angular extent of the rotation of the key blade 39 during each phase of the blade cutting operation. Thus, each change in the relative position of the blade 39 (i.e., rotation and axial) is electronically controlled through suitable programmable control means, and the same means also controls relative radial movement of the cutters 46.

FIG. 27 shows, in very diagrammatic form, one particular computer controlled key forming apparatus in which the basic key forming machine is indicated by the block 51. The machine 51 is controlled by a computer 52 which can be loaded with a software package 53 designed to enable selection of any one of a number of key forming operation sequences. Each such sequence will involve a number of standard steps, but the detail of each step may vary as discussed below. Also, special or non-standard steps may be involved in some sequences. It will be convenient to refer to the computer 52 and the associated machine control facilities collectively as control means 54.

Figure 28:
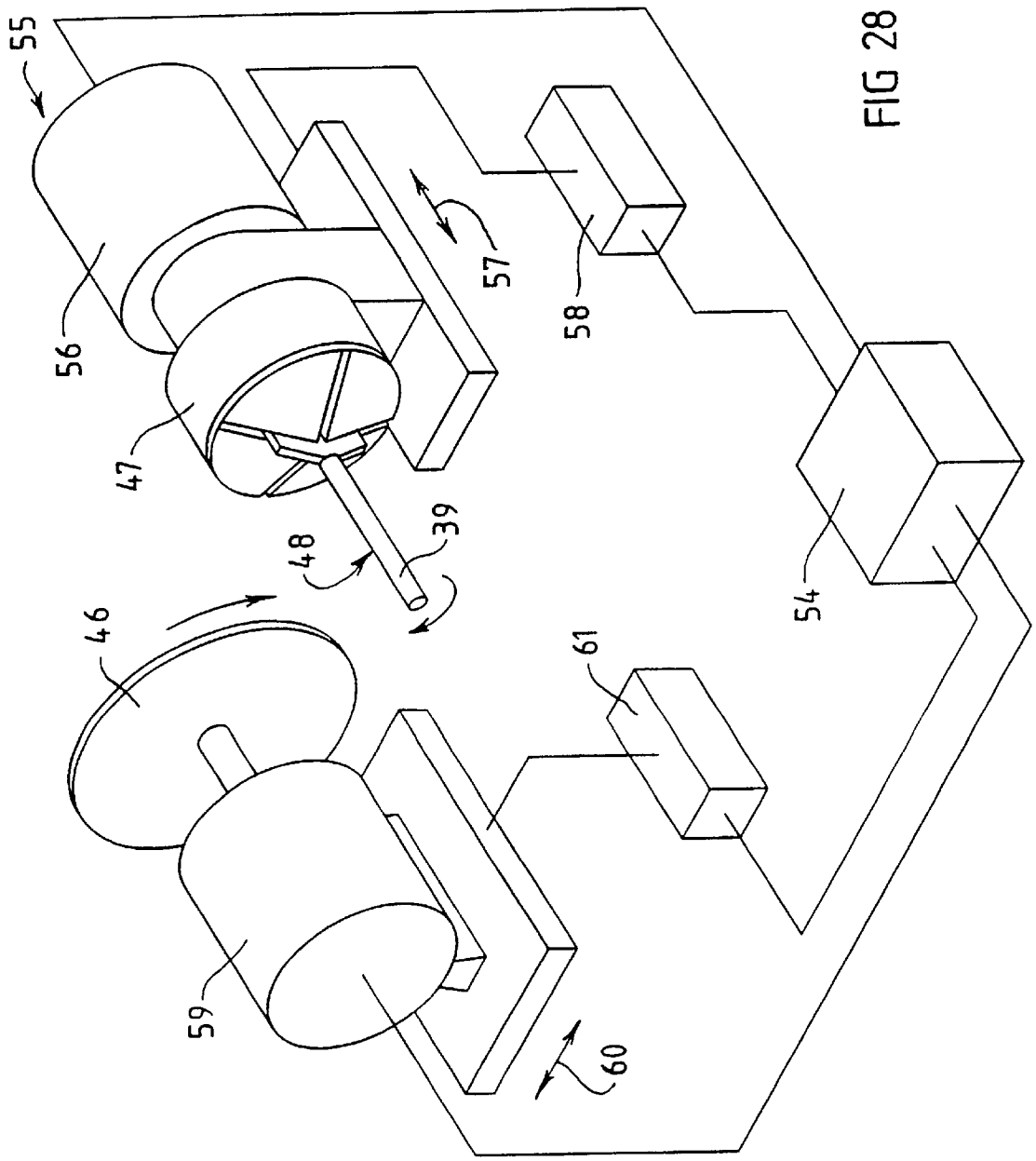
FIG. 28 is a diagrammatic view of one form of key forming apparatus in accordance with the invention.

It will be also convenient to describe the sequence of operations by reference to one particular machine arrangement, which is that illustrated diagrammatically by FIG. 28. The illustrated machine includes a key blank holding device, such as a chuck 47, and at least one surface forming tool 46 as previously described.

The chuck 47 is required to rotate the key blank 48 as previously described, and for that purpose the chuck 47 is connected to first drive means 55 which may include a reversible motor 56 of any suitable form. It is also necessary to provide means whereby the tool 46 and the key blank 48 can be moved relative to one another in the axial direction of the blade 39. For that purpose, in the arrangement shown by FIG. 28, the chuck 47 and associated drive means 55 are mounted for suitably guided movement towards and away from the tool 46 in the direction of arrows 57, and drive means 58 (of any suitable type) is provided to control that movement.

In the arrangement shown by FIG. 28, it is also possible for the tool 46 and the key blade 48 to move relative to one another in a direction transverse to the longitudinal axis of the blade 39. That relative movement may be achieved in any suitable manner. By way of example, FIG. 28 shows the tool 46 and its associated drive motor 59 mounted for movement towards and away from the blank 48 in the direction shown by arrows 60, and that movement is controlled by drive means 61 of any suitable type. Any appropriate means may be adopted to guide the tool 46 in the required directions of movement.

As shown diagrammatically by FIG. 28, each drive means 55, 58 and 61 is connected to the control means 54 so as to operate in accordance with instructions (signals) received from the control means 54. The instructions will be as determined by a particular one of a number of operation sequences which are available for selection by the operator of the machine 51. By way of example, the selected sequence of operations may include the following steps:

(a) successively forming each of a plurality of indexing sections on the blade of the key blank at respective locations which are spaced apart in the longitudinal direction of the blade, (b) forming a ramp surface on the blade between each successive indexing section forming operations, (c) holding the blade against movement about the axis of rotation during each indexing section forming operation, and (d) moving the blade about the axis of rotation through a predetermined angle of rotation during each ramp surface forming operation.

The control means 54 will regulate operation of the machine 51 such that the machine will proceed automatically through the selected sequence of operations. During any such sequence the aforementioned predetermined angle of rotation may be different for at least two of the ramp surface forming operations. Also, the direction of rotational movement of the blade may be different during each of at least two ramp surface forming operations. Furthermore, during each ramp surface forming operation there may be relative movement between the blade and the blade forming means in the longitudinal direction of the blade. That relative movement may occur simultaneous with the aforementioned rotational movement of the blade, and it is preferred that the relative longitudinal movement continues without interruption until formation of the alternating series of indexing and ramp surfaces 41, 45 is completed.

When forming a key blade by means of a single cutter 46 as shown by FIG. 28, it may be convenient to form a first series of alternating indexing surfaces 41 and ramp surfaces 45 along the length of the blade 39, and then subsequently forming a second such series of alternating indexing surfaces 41 and ramp surfaces 45 along the blade 39. In such a method, the rotational position of the blade 39 at commencement of formation of the second series will be 180° different to the rotational position of the blade at commencement of formation of the first series.

It is preferred that the machine 51 is able to be operated manually in the event of failure of the computer 52. For that purpose, a manual control panel 62 may be connected to the machine 51 as shown by FIG. 27. The panel 62 may respond to operation of a keyboard through which the operator can send appropriate signals to the machine 51, and it is preferred that the panel 62 is controllable by a software package which can be the same as or similar to that used with the computer 52. The arrangement is such that the operator can select a particular sequence of operations, and having made that selection can then instruct the machine 51 through use of the keyboard. The selected program preferably functions to ensure that incorrect keyboard entries are not recognised and thereby ensure that the key blade will be formed in accordance with the particular code to which the selected sequence of operations is directed.

A key forming method of the foregoing kind involves relatively simple apparatus and has the benefit of enabling accurate formation of a key blade.

A lock according to the invention possesses substantial improvements over prior locks of a similar kind, including improvements in manufacturing cost and improvements in security of operation.

Various alterations, modifications and/or additions may be introduced into the constructions and arrangements of parts previously described without departing from the spirit or ambit of the invention as defined by the appended claims.

What is claimed is:

1. A tumbler lock including, a lock body, a barrel assembly mounted in said lock body for relative movement about an axis of rotation, a retention means being operative to retain said barrel assembly against removal from said lock body and including a movable member, said barrel assembly including a plurality of disc tumblers, each of which is rotatable about said axis of rotation relative to each other, said disc tumblers including at least one standard disc tumbler and at least one dual function disc tumbler, and a side locking bar which is operative to prevent rotation of said barrel assembly relative to said lock body when said tumbler lock is in a locked condition, said side locking bar being inoperative to prevent said barrel assembly rotation when each said standard disc tumbler is in a service position of rotation relative to said lock body and said dual function disc is in either a service position of rotation or a second function position of rotation relative to said body, said movable member interacting with said dual function disc tumbler when said dual function disc tumbler is in said second function position of rotation so as to thereby render said retention means inoperative to prevent said removal of said barrel assembly, whereby said barrel assembly is able to be removed from said lock body when each said standard disc tumbler is in said service position and said dual function disc tumbler is in its respective said second function position.

2. A tumbler lock according to claim 1, wherein at least one said disc tumbler has two or more said service positions.

3. A tumbler lock according to claim 1, wherein said dual function disc tumbler, or at least one said dual function disc tumbler, has two or more said second function positions of rotation.

4. A tumbler lock according to claim 1, including at least two standard disc tumblers.

5. A tumbler lock according to claim 1, wherein each said disc tumbler is arranged in face to face relationship with at least one another said disc tumbler.

6. A tumbler lock according to claim 1, wherein there is one said dual function disc tumbler.

7. A tumbler lock according to claim 1, wherein said locking bar is an elongate member which is arranged substantially parallel to said axis of rotation and is movable towards and away from that axis between two positions at which said locking bar is operative and inoperative respectively, and said locking bar extends across a plane of separation between said lock body and said barrel assembly when the locking bar is in said operative position.

8. A tumbler lock according to claim 1, wherein said locking bar is maintained in said operative position by engagement with a peripheral surface of at least one said standard disc tumbler when that disc tumbler is in a position of rotation other than said service position, or by engagement with a peripheral surface of at least one said dual function disc tumbler when that tumbler is in a position other than either said service position or said second function position.

9. A tumbler lock according to claim 8, wherein at least one lock release recess is provided in said peripheral surface of each said disc tumbler, at least one barrel release recess is provided in said peripheral surface of said at least one dual function disc tumbler, each said lock release recess is adapted to receive said side locking bar and thereby permit said side locking bar to adopt said inoperative position when the respective said at least one dual function disc tumbler is in a said service position, and said barrel release recess is adapted to receive said side locking bar and thereby permit said side locking bar to adopt said inoperative position when the dual function disc tumbler is in said second function position.

10. A tumbler lock according to claim 9, wherein the number of said lock release recess provided in a said disc tumbler corresponds to the number of said service positions of that tumbler, and the number of said barrel release recesses provided in a said dual function disc tumbler corresponds to the number of said second function positions of that tumbler.

11. A tumbler lock according to claim 9, wherein said barrel assembly is removable from said lock body by being moved axially through an end of said lock body, retention means is operative to prevent said removal, and said retention means is rendered inoperative to prevent said removal when the or each said dual function disc tumbler is in a said second function position of rotation.

12. A tumbler lock according to claim 11, wherein said retention means includes at least one movable detent which is connected to said barrel assembly and is received in a detent release recess of said dual function disc tumbler when that disc tumbler is at said second function position so as to thereby render said movable detent inoperative to prevent said barrel assembly removal.

13. A tumbler lock according to claim 12, wherein said dual function disc tumbler includes at least one said detent release recess in addition to at least one said lock release recess and at least one said barrel release recess.

14. A tumbler lock according to claim 12, wherein said dual function disc tumbler includes at least one said lock release recess and at least one said barrel release recess, and said barrel release recess functions as the said detent release recess when said dual function disc tumbler is in said second function position.

15. A tumbler lock according to claim 6, wherein said barrel assembly is removable from said body by being moved axially through an end of said body, retention means is operative to prevent said removal, and said retention means is rendered inoperative to prevent said removal when the or each said dual function disc tumbler is in a said second function position.

16. A tumbler lock according to claim 15, wherein said retention means includes at least one movable detent which is connected to said barrel assembly and is received in a detent release recess of said dual function disc tumbler when that disc tumbler is at said second function position so as to thereby render said movable detent inoperative to prevent said barrel assembly removal.

17. A tumbler lock according to claim 12, wherein said movable detent is a metal ball.

18. A tumbler lock according to claim 12, including two said movable detents which are located approximately 180° apart around the circumference of said barrel assembly.

19. A tumbler lock according to claim 11, wherein said retention means includes at least one fixed detent which is connected to said barrel assembly and projects beyond a radially outer surface of said barrel assembly, a circumferential groove is formed in an inner surface of said lock body and slidably receives said fixed detent so as to thereby permit rotation of the barrel assembly relative to the lock body, a barrel release groove is formed in said inner surface of said lock body and extends generally in the direction of said axis of rotation, and said fixed detent is rendered inoperative to prevent said barrel assembly removal when said barrel assembly is at a barrel removal position of rotation relative to said lock body at which said fixed detent is aligned with said barrel release groove so as to be slidably receivable in that groove.

20. A tumbler lock according to claim 19, including at least two said fixed detents which are spaced apart in the axial direction of said barrel assembly, two said circumferential grooves are formed in said inner surface of said lock body, and each said fixed detent is slidably located in a respective one of said circumferential grooves.

21. A tumbler lock according to claim 19, including at least two said fixed detents which are spaced apart in the circumferential direction of said barrel assembly, said lock body is provided with two said barrel release grooves, and each said fixed detent is aligned with a respective one of said barrel release grooves when said barrel assembly is at said barrel removal position.

22. A tumbler lock according to claim 20, wherein said two fixed detents are spaced apart in the circumferential direction of said barrel assembly, said lock body is provided with two said barrel release grooves, and each said fixed detent is aligned with a respective one of said barrel release grooves when said barrel assembly is at said barrel removal position.

23. A tumbler lock according to claim 21, wherein a first one of said barrel release grooves has a longitudinal extent less than that of a second one of said barrel release grooves, and one of said fixed detents is positioned on said barrel assembly axially beyond an end of said first barrel release groove.

24. A tumbler lock according to claim 23, wherein said second barrel release groove receives said side locking bar when the lock is in said locked condition.

25. A tumbler lock according to claim 1, wherein said barrel assembly includes a cylindrical tubular sleeve which contains each of said plurality of disc tumblers, said sleeve is rotatable about said rotational axis relative to said lock body, and each of said plurality of disc tumblers is rotatable about said rotational axis relative to said sleeve.

26. A tumbler lock according to claim 19, wherein said barrel assembly includes a cylindrical tubular sleeve which contains each of said plurality of disc tumblers, said sleeve is rotatable about said rotational axis relative to said lock body, each of said plurality of disc tumblers is rotatable about said rotational axis relative to said sleeve, each said fixed detent is secured to or formed integral with said sleeve, and said radially outer surface is an outer surface of said sleeve.

27. A tumbler lock according to claim 1, wherein each of said plurality of disc tumblers has a non-circular opening extending through the axial center thereof, and each said opening forms part of a keyway passage for receiving a key for said tumbler lock.

28. A tumbler lock and key combination, wherein the tumbler lock is in accordance with claim 1 and the key is a service key which is operable to cause each of said plurality of disc tumblers to adopt a respective said service position.

29. A combination according to claim 28, wherein said service key includes an elongate blade having a plurality of tumbler indexing sections which are spaced apart in the longitudinal direction of said blade and each of which coacts with a respective one of said plurality of disc tumblers so as to retain that disc in its respective said service position.

30. A tumbler lock and key combination, wherein the tumbler lock is in accordance with claim 1, and the key is a barrel removal key which is operable to cause the or each said standard disc tumbler to adopt a respective said service position, and to cause the or each said dual function disc tumbler to adopt a said second function position.

31. A combination according to claim 30, wherein said barrel removal key includes an elongate blade having a plurality of tumbler indexing sections which are spaced apart in the longitudinal direction of said blade, said indexing sections including at least one standard indexing section and at least one special indexing section, said standard indexing section coacting with said at least one standard disc tumbler so as to retain that disc in its respective said service position, and said special indexing section coacting with said at least one dual function disc tumbler so as to retain that disc in its respective said second function position.

32. A combination according to claim 31, wherein said key interacts with each of said plurality of disc tumblers during insertion of said blade into the tumbler lock so it thereby causes rotation of each said disc relative to said lock body, each of said plurality of disc tumblers having said service position or said second function position when said blade is fully inserted into the tumbler lock, and said key is rotated from an initial position to a barrel removal position in order to rotate said barrel assembly relative to said lock body to a position at which said barrel assembly is able to be removed from said lock body in the direction of said axis of rotation.

33. A tumbler lock including, a lock body, a barrel assembly mounted in said lock body for relative movement about an axis of rotation, said barrel assembly including a plurality of disc tumblers, each of which is rotatable about said axis of rotation relative to each other, said disc tumblers including at least one standard disc tumbler and at least one dual function disc tumbler, and a side locking bar which is operative to prevent rotation of said barrel assembly relative to said lock body when said lock is in a locked condition, and which is inoperative to prevent said barrel assembly rotation when each said disc tumbler is in a service position of rotation relative to said lock body, and is also inoperative when the or each standard disc tumbler is in its respective said service position and the or each said dual function disc tumbler is in a second function position of rotation relative to said lock body, said barrel assembly being removable from said lock body by being moved axially through an end of said lock body, retention means being operative to prevent said removal, and said retention means being rendered inoperative to prevent said removal when the or each said dual function disc tumbler is in a said second function position, said retention means including at least one movable detent which is connected to said barrel assembly and is received in a detent release recess of said dual function disc tumbler when that disc tumbler is at said second function position so as to thereby render said movable detent inoperative to prevent said barrel assembly removal.

34. A tumbler lock including, a lock body, a barrel assembly mounted in said lock body for relative movement about an axis of rotation, said barrel assembly including a plurality of disc tumblers, each of which is rotatable about said axis of rotation relative to each other, said disc tumblers including at least one standard disc tumbler and at least one dual function disc tumbler, and a side locking bar which is operative to prevent rotation of said barrel assembly relative to said lock body when said lock is in a locked condition, and which is inoperative to prevent said barrel assembly rotation when each said disc tumbler is in a service position of rotation relative to said lock body, and is also inoperative when the or each standard disc tumbler is in its respective said service position and the or each said dual function disc tumbler is in a second function position of rotation relative to said lock body, said locking bar being maintained in said operative position by engagement with a peripheral surface of at least one said standard disc tumbler when that disc tumbler is in a position of rotation other than said service position, or by engagement with a peripheral surface of at least one said dual function disc tumbler when that tumbler is in a position other than either said service position or said second function position, at least one lock release recess is provided in said peripheral surface of each said disc tumbler, at least one barrel release recess is provided in said peripheral surface of the or each said dual function disc tumbler, each said lock release recess is adapted to receive said side locking bar and thereby permit said side locking bar to adopt said inoperative position when the respective said disc tumbler is in a said service position, and said barrel release recess is adapted to receive said side locking bar and thereby permit said side locking bar to adopt said inoperative position when the dual function disc tumbler is in said second function position, said barrel assembly being removable from said lock body by being moved axially through an end of said lock body, retention means being operative to prevent said removal, said retention means being rendered inoperative to prevent said removal when the or each said dual function disc tumbler is in a said second function position, said retention means including at least one movable detent which is connected to said barrel assembly and is received in a detent release recess of said dual function disc tumbler when that disc tumbler is at said second function position so as to thereby render said movable detent inoperative to prevent said barrel assembly removal.

35. A tumbler lock according to claim 34, wherein said dual function disc tumbler includes at least one said detent release recess in addition to at least one said lock release recess and at least one said barrel release recess.

36. A tumbler lock according to claim 34, wherein said dual function disc tumbler includes at least one said lock release recess and at least one said barrel release recess, and said barrel release recess functions as the said detent release recess when said dual function disc tumbler is in said second function position.

37. A tumbler lock according to claim 34, wherein said movable detent is a metal ball.

38. A tumbler lock according to claim 34, including two said movable detents which are located approximately 180° apart around the circumference of said barrel assembly.

39. A tumbler lock including, a lock body, a barrel assembly mounted in said lock body for relative movement about an axis of rotation, said barrel assembly including a plurality of disc tumblers, each of which is rotatable about said axis of rotation relative to each other, said disc tumblers including at least one standard disc tumbler and at least one dual function disc tumbler, and a side locking bar which is operative to prevent rotation of said barrel assembly relative to said lock body when said tumbler lock is in a locked condition, and which is inoperative to prevent said barrel assembly rotation when the or each standard disc tumbler is in a service position of rotation relative to said lock body, and is also inoperative when the or each standard disc tumbler is in its respective said service position and the or each said dual function disc tumbler is in a second function position of rotation relative to said lock body, said at least one dual function disc tumbler permitting release of said barrel assembly from said lock body when the or each standard disc tumbler is in said service position and said dual function disc tumbler is in said second function position, said locking bar being maintained in said operative position by engagement with a peripheral surface of at least one said standard disc tumbler when that disc tumbler is in a position of rotation other than said service position, or by engagement with a peripheral surface of at least one said dual function disc tumbler when that tumbler is in a position other than either said service position or said second function position, at least one lock release recess being provided in said peripheral surface of each said disc tumbler, at least one barrel release recess being provided in said peripheral surface of the or each said dual function disc tumbler, each said lock release recess being adapted to receive said side locking bar and thereby permit said side locking bar to adopt said inoperative position when the respective said disc tumbler is in a said service position, and said barrel release recess is adapted to receive said side locking bar and thereby permit said side locking bar to adopt said inoperative position when the dual function disc tumbler is in said second function position, said barrel assembly being removable from said lock body by being moved axially through an end of said lock body, retention means being operative to prevent said removal, and said retention means being rendered inoperative to prevent said removal when the or each said dual function disc tumbler is in said second function position, said retention means including at least one fixed detent which is connected to said barrel assembly and projects beyond a radially outer surface of said barrel assembly, a circumferential groove is formed in an inner surface of said lock body and slidably receives said fixed detent so as to thereby permit rotation of the barrel assembly relative to the lock body, a barrel release groove is formed in said inner surface of said lock body and extends generally in the direction of said axis of rotation, and said fixed detent being rendered inoperative to prevent said barrel assembly removal when said barrel assembly is at a barrel removal position of rotation relative to said lock body at which said fixed detent is aligned with said barrel release groove so as to be slidably receivable in that groove.

40. A tumbler lock according to claim 39, including at least two said fixed detents which are spaced apart in the axial direction of said barrel assembly, two said circumferential grooves are formed in said inner surface of said lock body, and each said fixed detent is slidably located in a respective one of said circumferential grooves.

41. A tumbler lock according to claim 39, including at least two said fixed detents which are spaced apart in the circumferential direction of said barrel assembly, said lock body is provided with two said barrel release grooves, and each said fixed detent is aligned with a respective one of said barrel release grooves when said barrel assembly is at said barrel removal position.

42. A tumbler lock according to claim 40, wherein said two fixed detents are spaced apart in the circumferential direction of said barrel assembly, said lock body is provided with two said barrel release grooves, and each said fixed detent is aligned with a respective one of said barrel release grooves when said barrel assembly is at said barrel removal position.

43. A tumbler lock according to claim 41, wherein a first one of said barrel release grooves has a longitudinal extent less than that of a second one of said barrel release grooves, and one of said fixed detents is positioned on said barrel assembly axially beyond an end of said first barrel release groove.

44. A tumbler lock according to claim 43, wherein said second barrel release groove receives said side locking bar when the lock is in said locked condition.

45. A tumbler lock according to claim 39, wherein said barrel assembly includes a cylindrical tubular sleeve which contains each of said disc tumblers, said sleeve being rotatable about said rotational axis relative to said lock body, each said disc tumbler being rotatable about said rotational axis relative to said sleeve, each said fixed detent being secured to or formed integral with said sleeve, and said radially outer surface is an outer surface of said sleeve.

* * * * *

UNITED STATES PATENT AND TRADEMARK OFFICE
CERTIFICATE OF CORRECTION

PATENT NO. : 6,725,696 B1
DATED : April 27, 2004
INVENTOR(S) : Brian Blight and Hans Juergen Esser It is certified that error appears in the above-identified patent and that said Letters Patent is hereby corrected as shown below:

Title page,
Item [75], after "Carnegie" insert -- Victoria --.

Column 2,
Line 67, "loping" should read -- sloping -- .

Column 4,
Line 28, "is" should read -- are --.

Column 9,
Line 37, "remains" should read -- remain --.
Line 38, "prevents" should read -- prevent --.

Column 16,
Line 22, "recess" should read -- recesses --.
Line 52, "6" should read -- 1 --.

Signed and Sealed this

Third Day of August, 2004

JON W. DUDAS
*Acting Director of the United States Patent and Trademark Office*